US007495902B2

(12) United States Patent
Connelly, Jr. et al.

(10) Patent No.: US 7,495,902 B2
(45) Date of Patent: Feb. 24, 2009

(54) STORAGE DEVICE ENCLOSURE (75) Inventors: Donald M. Connelly, Jr., San Jose, CA (US); Kenton Coleman Green, San Jose, CA (US); David Tung Lew, San Jose, CA (US); Kenneth Robert Schneebeli, San Jose, CA (US); Peter Paul Urbisci, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 10/828,784

(22) Filed: Apr. 21, 2004

(65) Prior Publication Data
US 2005/0237707 A1    Oct. 27, 2005

(51) Int. Cl.
*H05K 5/00* (2006.01)
*H05K 7/16* (2006.01)

(52) U.S. Cl. .............. 361/685; 361/727; 248/638; 248/562; 206/701

(58) Field of Classification Search ............ 361/685, 361/725, 726, 727; 248/638; 206/701
See application file for complete search history.

(56) References Cited

U.S. PATENT DOCUMENTS

| 5,858,509 | A | * | 1/1999 | Polch et al. ............. 428/166 |
| 5,917,676 | A | | 6/1999 | Browning ............. 360/97.01 |
| 6,049,451 | A | | 4/2000 | Schmitt et al. ........... 361/685 |
| 6,058,016 | A | | 5/2000 | Anderson et al. |
| 6,166,900 | A | | 12/2000 | Flynn et al. ............. 361/685 |
| 6,209,842 | B1 | * | 4/2001 | Anderson et al. ........ 248/560 |
| 6,233,143 | B1 | | 5/2001 | Gamble et al. |
| 6,249,432 | B1 | | 6/2001 | Gamble et al. ........... 361/685 |
| 6,272,010 | B1 | | 8/2001 | Schmitt ................. 361/685 |
| 6,282,087 | B1 | | 8/2001 | Gibbons et al. .......... 361/685 |
| 6,288,902 | B1 | | 9/2001 | Kim et al. .............. 361/725 |
| 6,395,073 | B1 | | 5/2002 | Dauber ................... 96/134 |
| 6,445,587 | B1 | * | 9/2002 | Pavol .................... 361/727 |
| 6,456,491 | B1 | | 9/2002 | Flannery et al. ......... 361/685 |
| 6,487,071 | B1 | | 11/2002 | Tata et al. .............. 361/685 |
| 6,490,242 | B1 | | 12/2002 | Bonn et al. ............. 369/261 |
| 6,498,723 | B1 | | 12/2002 | Konshak et al. ......... 361/685 |
| 6,775,142 | B1 | * | 8/2004 | Bell et al. .............. 361/725 |
| 2001/0001529 | A1 | | 5/2001 | Behl et al. ............ 312/223.1 |
| 2003/0011979 | A1 | | 1/2003 | Tanzer et al. ........... 361/685 |
| 2003/0030993 | A1 | | 2/2003 | Kitchen et al. .......... 361/726 |

OTHER PUBLICATIONS

"3M Constrained Layer Damper SJ-2052" http://products3.3m.com/catalog/us/en001/manufacturing_industry/specialty_tapes/node_GSBFTSZHQPbe/root_GST1T4S9TCgv/root_GSNYTMLW46ge/gvel_M6TSQBV9TZgl/theme_us_specialtytapes_3_0/command_AbcPageHandler/output_html.*

* cited by examiner

*Primary Examiner*—Jayprakash N Gandhi
*Assistant Examiner*—Zachary M Pape
(74) *Attorney, Agent, or Firm*—Kunzler & McKenzie (57) ABSTRACT

An enclosure for storage devices having at least one mounting surface and a viscoelastic layer disposed between a first layer and a second layer of the mounting surface. A receiver secured to the mounting surface within the enclosure receives a storage device carrier that retains a disk drive and positions the storage device carrier within the enclosure. Clip-on damped springs, coupled to the storage device carrier, guide the storage device carrier through the receiver and couple the storage device carrier to the mounting surface(s). A bezel of the storage device carrier is configured to receive a key in one of a plurality of key positions, with each key position corresponding to a particular disk drive/enclosure chassis interface.

3 Claims, 7 Drawing Sheets

STORAGE DEVICE ENCLOSURE

BACKGROUND OF THE INVENTION

1. Field of the Invention

This invention relates in general to enclosures for storage devices. Specifically, the present invention relates to enclosures with vibrational damping capabilities for receiving disk drive storage devices.

2. Description of the Related Art

In conventional disk drives, the data storage disk is mounted on a main body of the disk drive and is typically either mounted horizontally for rotation about a vertical axis or is mounted vertically for rotation about a horizontal axis. The disk head, which may be a read-only head or a read-and-write head is movably mounted on the main body of the disk drive in order to track across the disk to desired locations where data needs to be read or written. Such operations are known as "seek operations." Although in some circumstances the disk drive may be permanently and rigidly fixed to the enclosure chassis, it often occurs that the disk drive must be mounted so as to be easily removable from the enclosure chassis. For example, file server products often house a number of hard disk drives in a single enclosure chassis, in order to meet storage requirements.

Whether the disk drives are mounted vertically or horizontally, a problem arises with regard to the operation of disk drives when mounted next to each other. The problem occurs during seek movements of the actuator across the disk. The rotational energy created by a disk drive actuator is often sufficient to move the body of the disk drive and create servo errors. Such movement can result in write inhibits, soft errors, and slow response time, generally characterized as self-induced problems. In recent years the actuators on disk drives have generally adopted a linear to rotary operation, in which the read/write head moves in an arc across the disk, rotating about a vertical axis (for a horizontal disk) on the main body of the disk drive outside the perimeter of the disk.

The acceleration and deceleration of such a rotary actuator produce rotary oscillation of the main body of the disk drive in a horizontal plane. The axis acceleration and deceleration of the actuator containing the read/write heads, particularly on high performance disk drives, results in an equivalent reaction to the main body of the disk drive. In addition, when the disk stack is out of balance, the rotating disks cause vibration in the drive. These vibrations may be transmitted through the enclosure chassis to adjacent drives sharing a common support, such as a mounting wall. This vibration transmission may result in write inhibits, soft errors, and slow response from the disk drives, generally characterized as vibration transmission problems.

Further, when the systems using the disk drives indicate problems generally attributable to damaged disk drives, the disk drive may be replaced, when in reality the disk drive is not damaged, rather vibration transmissions resulting from am enclosure chassis having insufficient stiffness and damping may be causing the problems.

As more tracks are written per inch on disk drives, the severity of the problems will increase as the read/write head makes increased movement across the disks. Thus, future disk drive products will require enclosure chassis that take vibration transmission more into account.

Current attempts to eliminate excessive vibration in disk drives have focused on damping springs mounted between disk storage device carriers and the enclosure chassis. In some situations, when the disk drive vibration transmissions are minor, the current methods may be adequate. However, in other situations when the disk drive vibration transmissions are greater, more protections are necessary. Additionally, the method of securing the springs to the disk storage device carriers is often time consuming and costly due to additional components and manufacturing processes.

Furthermore, current enclosure chassis are configured to accept any storage device carrier, regardless of the disk drive's interface (e.g., FC, SCSI, SATA, or SAS). Consequently, it is not uncommon for a disk drive or an enclosure chassis to be damaged when a disk drive with an incompatible interface is placed in an enclosure chassis. For example, when a disk drive having an FC interface is positioned into a enclosure chassis configured to receive a disk drive with an SCSI interface, either the disk drive interface is damaged, the enclosure chassis connection is damaged, or both are damaged.

Therefore, the design of the enclosure chassis and storage device carrier has a significant impact on the magnitude of the problems discussed above. The vibration transmission problems can be resolved with a very soft, or isolation type enclosure chassis construction. The self-induced problems can be solved with a very stiff or hard enclosure chassis construction. The solution to one problem, however, may counteract attempts to solve the other problem, or even aggravate the other problem. To resolve both problems, the enclosure chassis must have sufficient stiffness to minimize self-induced problems, and sufficient damping to prevent significant vibration transmissions from adjacent disk drives.

What is needed is an enclosure for a storage device that absorbs vibration transmitted from a disk drive to other disk drives mounted within the same enclosure minimizes self-induced vibration problems. There is also a need to decrease the manufacturing costs associated with the damping system, as well as to decrease error-related costs from damaged disk drive interface connections.

SUMMARY OF THE INVENTION

The present invention has been developed in response to the present state of the art, and in particular, in response to the problems and needs in the art that have not yet been fully solved by currently available enclosures for storage devices. Accordingly, the present invention has been developed to provide an improved enclosure chassis with damped elements configured to curtail disk drive vibration transmissions while maintaining structural rigidity. The present invention also decreases manufacturing costs by using clip-on damped springs to dampen vibration and keyed bezel positions to prevent damage to the interface connection in the enclosure and in the disk drive, thus overcoming many or all of the above-discussed shortcomings in the art.

The present invention solves many or all of the above-described problems by providing an improved enclosure for storage devices. An enclosure chassis stores at least one disk drive, storage device, hard disk drive, or nonvolatile storage device, and includes at least one mounting surface having a viscoelastic layer disposed between a first layer and a second layer to reduce vibration propagation throughout the mounting surface(s). A receiver, secured to the mounting surface within the enclosure chassis and configured to receive a storage device carrier retaining a disk drive, positions the storage device carrier to the mounting surface(s). Clip-on damped springs are coupled to the storage device carrier for guiding the storage device carrier through the receiver and for coupling the storage device carrier to the mounting surface(s). A bezel of the storage device carrier is configured to receive a key in one of a plurality of key positions, with each key position corresponding to a particular disk drive/enclosure chassis interface.

The damped enclosure chassis according to the invention overcomes problems caused by self-induced vibration and problems caused by vibrations transmitted from other disk drives stored in the enclosure chassis. A further advantage of using a damped enclosure chassis according to the invention is that the vibration transmission problems have been overcome, whereby functioning drives should no longer be replaced unnecessarily.

The clip-on damped springs according to the invention reduce part count, reduce manufacturing processes, and reduce time in manufacturing.

An advantage of the keying elements is that it eliminates enclosure/disk drive interface connection damage resulting from attempts to connect incompatible interface connections.

Reference throughout this specification to features, advantages, or similar language does not imply that all of the features and advantages that may be realized with the present invention should be, or are, in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
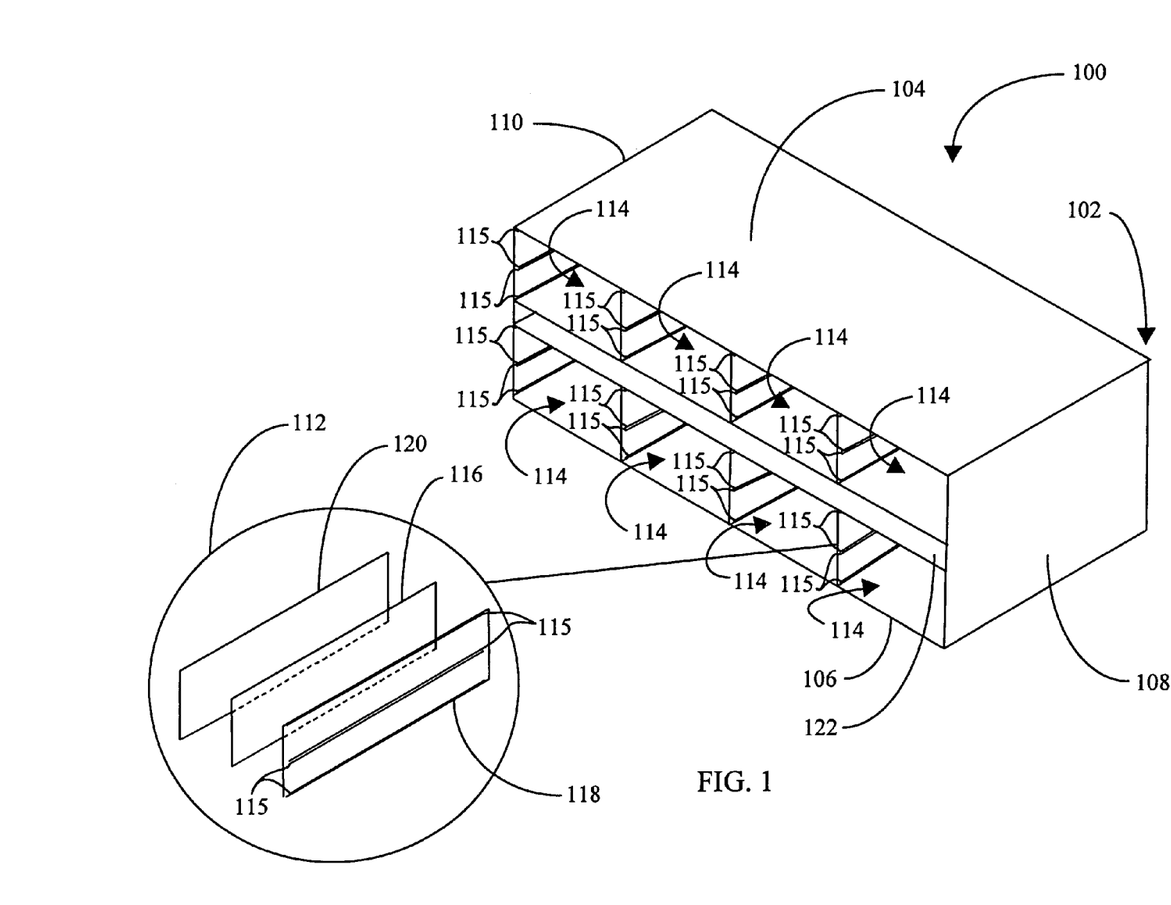
FIG. 1 is a perspective view illustrating one embodiment of an enclosure chassis in accordance with the present invention.

FIG. 1 illustrates one embodiment of an enclosure device 100 for mounting storage devices (not shown). In the depicted embodiment, the enclosure device 100 includes an enclosure chassis 102. The enclosure chassis 102 comprises a top member 104, a bottom member 106, first and second side members 108 and 110, and a plurality of vertical mounting surfaces 112 that partition the enclosure chassis 102 into a plurality of horizontally and vertically aligned drive bays 114. The top member 104, bottom member 106, and first and second side members 108 and 110 form a box for holding the storage devices. The mounting surfaces 112 include a receiver 115 secured to the mounting surface 112. The receiver 115 is configured to receive a storage device carrier retaining a disk drive. The receiver 115 positions the storage device carrier relative to the mounting surface(s) 112. The storage device carriers engage the mounting surfaces 112 by way of the receiver 115. In one embodiment, the receiver 115 comprises a pair of rails that engage the storage device carrier. This embodiment also includes an interface device shelf 122 positioned between the horizontally aligned drive bays 114.

The use of the mounting surfaces 112 to create drive bays 114 within the enclosure chassis 102 maximizes the density of storage devices that may be mounted in the enclosure chassis 102. The stiff attributes of the enclosure chassis 102 and mounting surfaces 112 reduce the amount of individual storage device vibration, and reduce the amount of vibration transmissions between storage devices 100, for example, through adjoining and adjacent mounting surfaces.

Additionally, the positioning of the interface device shelf 122 improves stiffness of the enclosure chassis 102 and provides a void between adjacent drive bays 114 to reduce vibration propagation to the adjacent drive bays 114. In the illustrated embodiment, the interface device shelf 122 separates the upper drive bays 114 from the lower drive bays 114, thus reducing vibration propagation between the upper drive bays 114 and the lower drive bays 114.

In one embodiment, to further reduce vibration propagation, the mounting surfaces 112 comprise a viscoelastic element 116 positioned between a first element 118 and a second element 120. The first and second elements 118 and 120, respectively, may be formed from a number of different materials, such as metals, plastics, carbon fiber materials, etc. The viscoelastic element 116 preferably comprises a viscoelastic material, which in one embodiment may be a damping adhesive. For example, the viscoelastic element 116 may comprise ANATROL R980 Damping Adhesive, discussed in U.S. Pat. No. 6,209,842, which is incorporated herein by reference for its supportive teachings.

The combination of stiffness of the enclosure device 102 and damping between first and second elements 118 and 120 of the mounting surfaces 112 minimizes vibration propagation.

In one embodiment, the top member 104, bottom member 106, and first and second side members 108 and 110 may also comprise a viscoelastic element 116 for reducing vibration propagation that passes through the mounting surfaces 112.

Figure 2A:
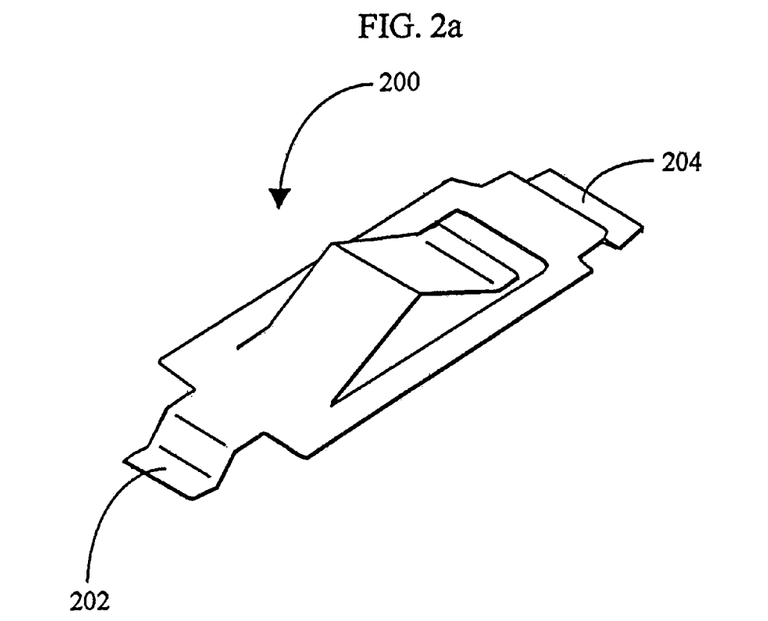
FIG. 2a is a perspective view illustrating one embodiment of a clip-on damped spring
Figure 2B:
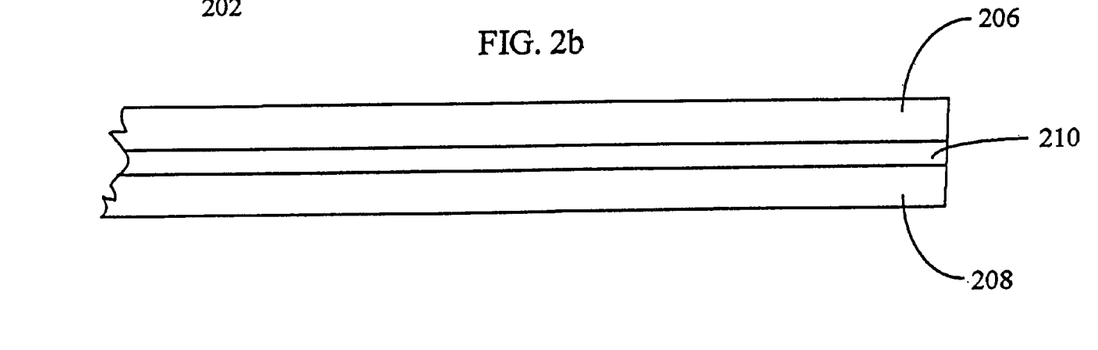
FIG. 2b is a side cross-section view illustrating layers of one embodiment of a clip-on damped spring.
Figure 3:
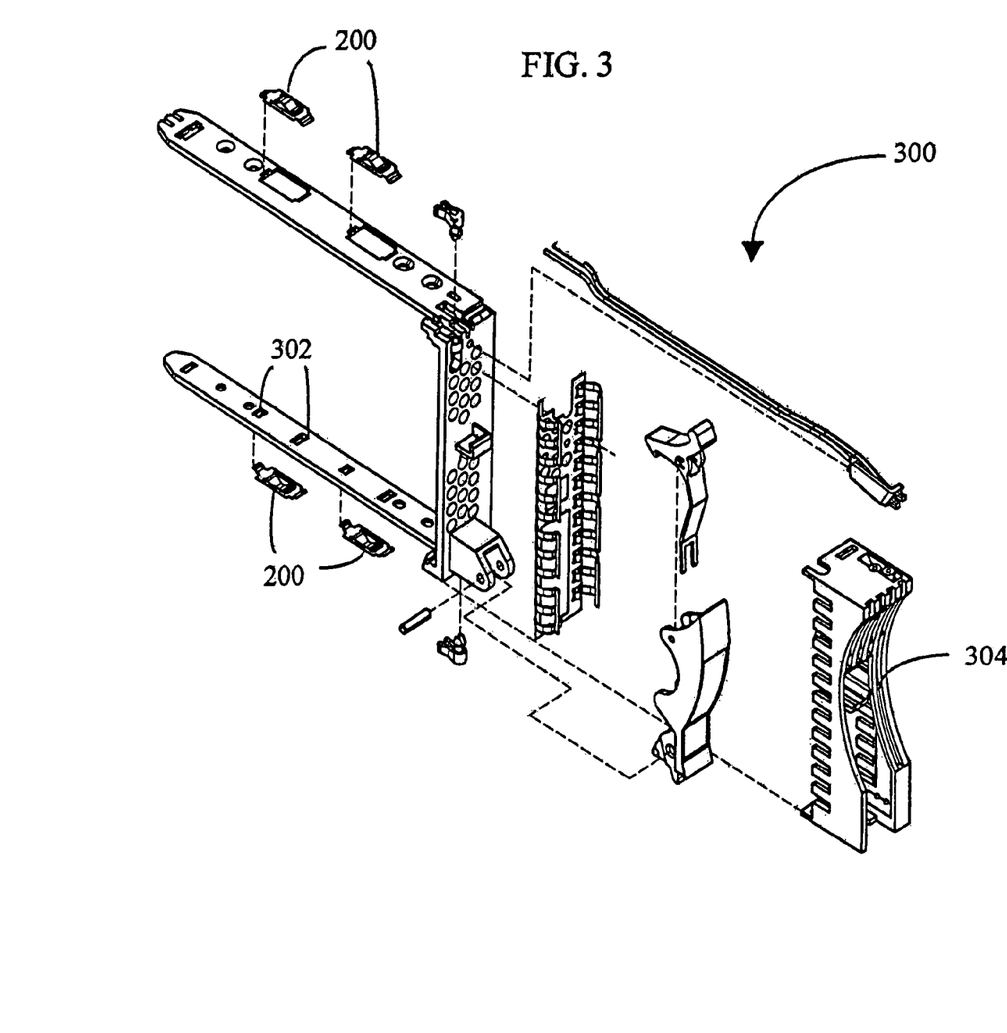
FIG. 3 is a perspective view illustrating one embodiment of the application of the clip-on damped spring.

FIGS. 2a, 2b, and 3 illustrate one embodiment of a clip-on damped spring 200 according to the present invention. The clip-on damped spring 200 comprises a first end 202 and a second end 204 configured to attach directly to slots 302 located on a storage device carrier 300 (See FIG. 3). The clip-on damped spring 200 further comprises a top element 206 and a bottom element 208, and a viscoelastic element 210 between the top and bottom elements 206 and 208. The viscoelastic element 210 may be a damping adhesive, such as ANATROL R980, discussed above. The viscoelastic element 210 is configured to reduce vibration propagation between adjacent and adjoining storage devices within the enclosure chassis 102. The clip-on damped spring 200 is configured to couple the storage device carrier 300 to the mounting surface 112 (See FIG. 1). The combination of damped mounting surfaces 112 and damped clip-on springs 200 further decreases vibration propagation.

Figure 4:
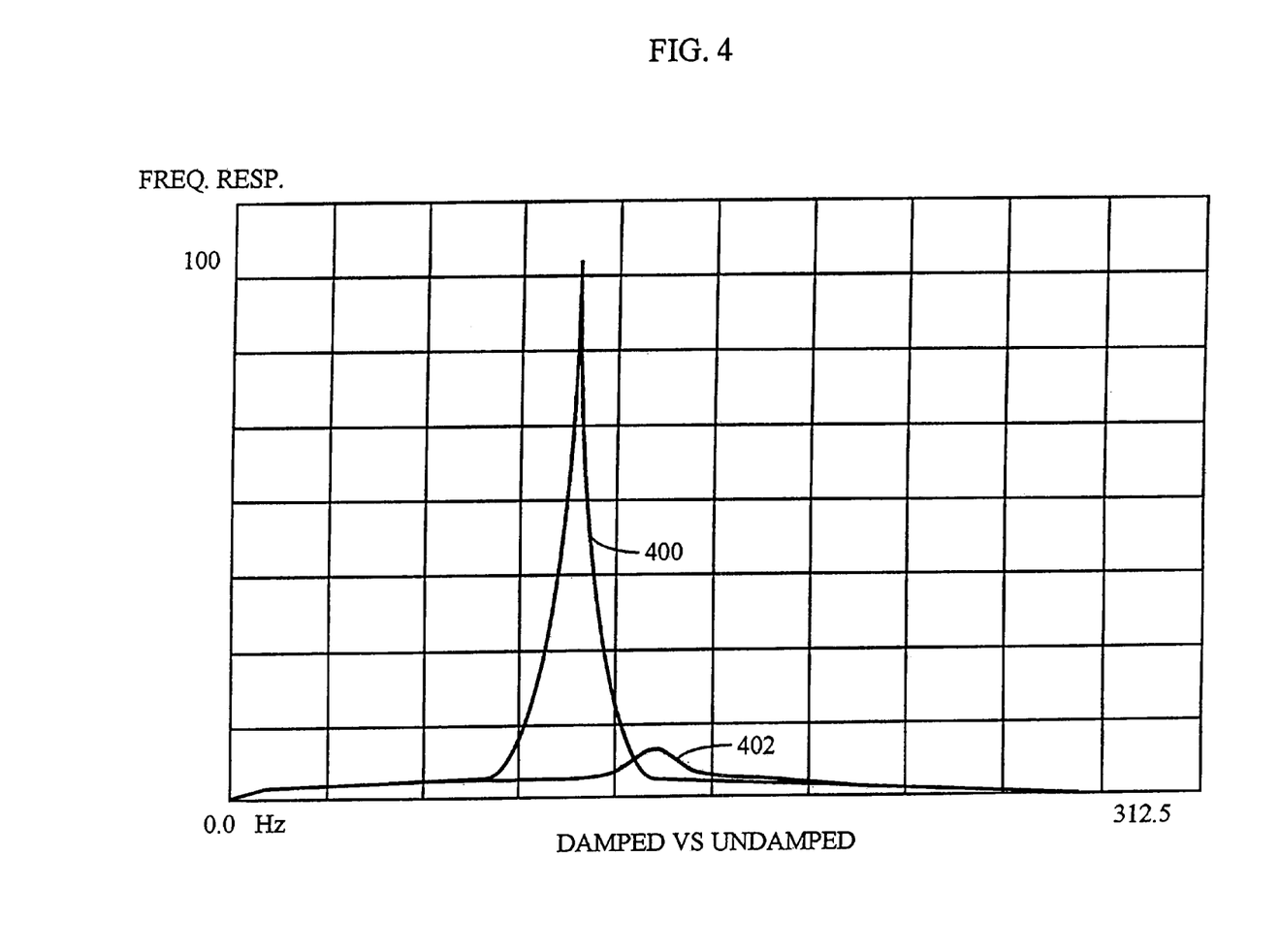
FIG. 4 is a frequency response diagram from an exemplary damping measurement.

FIG. 4 illustrates a frequency response graph representing experimental data showing the damping effect on two stainless steel members with and without the viscoelastic element 116. The two stainless steel members are representative of the top and bottom elements 206 and 208 of the clip-on spring 200 discussed above. The two stainless steel members were sized 0.5"×2.0" and had a thickness of 0.02". Initially, the steel members were clamped together at each end with bolts. One end was attached to a shaker which produced random vibrations from 0-300 Hz. Accelerometers were connected to both the cantilevered end and the shaker end, and an FFT (Fast Fourier Transform) analyzer was used to measure the transfer function between the accelerometers.

To form the damped member, ANATROL R980 was placed between the steel members, which were then clamped together, and measurements were taken. The horizontal axis is the frequency and the vertical axis is a linear scale of magnitude. The data, represented by line 400 represents the frequency response of the undamped member. A large-magnitude resonance occurs at about 111 Hz. The data, represented by line 402 represents the frequency response of the damped member. The resonance occurs at a higher frequency and decreases significantly in magnitude for the damped member. Some characteristics of the measurements are given in Table 1 below.

TABLE 1

|  | Frequency | Magnitude | Percent of Critical Damping |
| --- | --- | --- | --- |
| Undamped members | 111.3 Hz | 39.1 dB | 0.70% |
| Damped members | 137.9 Hz | 18.5 dB | 7.70% |

The damping in percent of the critical damping as given in Table 1 above was calculated from the transfer function measured by the FFT analyzer. A significant damping (of the order of 20 dB, or a factor of 10) was obtained by using the viscoelastic adhesive in this experiment.

Accordingly, applying a viscoelastic element 116 to a member has been found to drastically reduce the amount of vibration. Reducing the amount of vibration in the member further reduces the amount of vibration that propagates to adjoining members. For example, applying a viscoelastic element 116 to the mounting surfaces 112 reduces the vibration in the mounting surfaces 112 as well as the vibration that spreads throughout the enclosure device 102.

Figure 5:
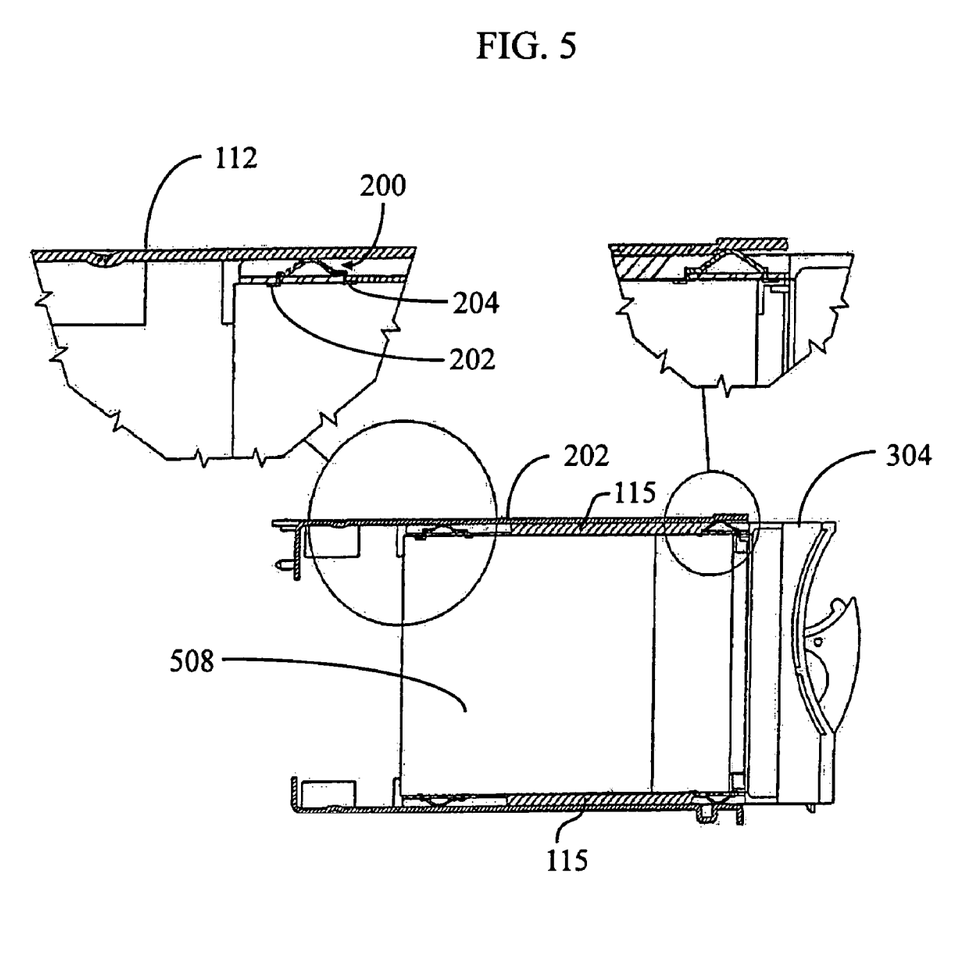
FIG. 5 is a top cross-sectional view illustrating one embodiment of a storage device carrier with clip-on damped springs.

FIG. 5 illustrates one embodiment of a storage device carrier 300 (See FIG. 3), including a disk drive 508, and the clip-on damped springs 200. The clip-on damped springs 200 position and secure the storage device carrier 300 to the mounting surfaces 112 (See FIG. 1) of the enclosure chassis 102 (See FIG. 1). The clip-on damped springs 200 further reduce vibration originating from the disk drive 508. Due to the damping nature of the clip-on damped springs 200, less vibration passes to the mounting walls 112. Accordingly, because less vibration passes to the mounting walls 112, adjoining and adjacent disk drives 508 are less affected, if at all, by vibrating disk drives 508

Figure 6:
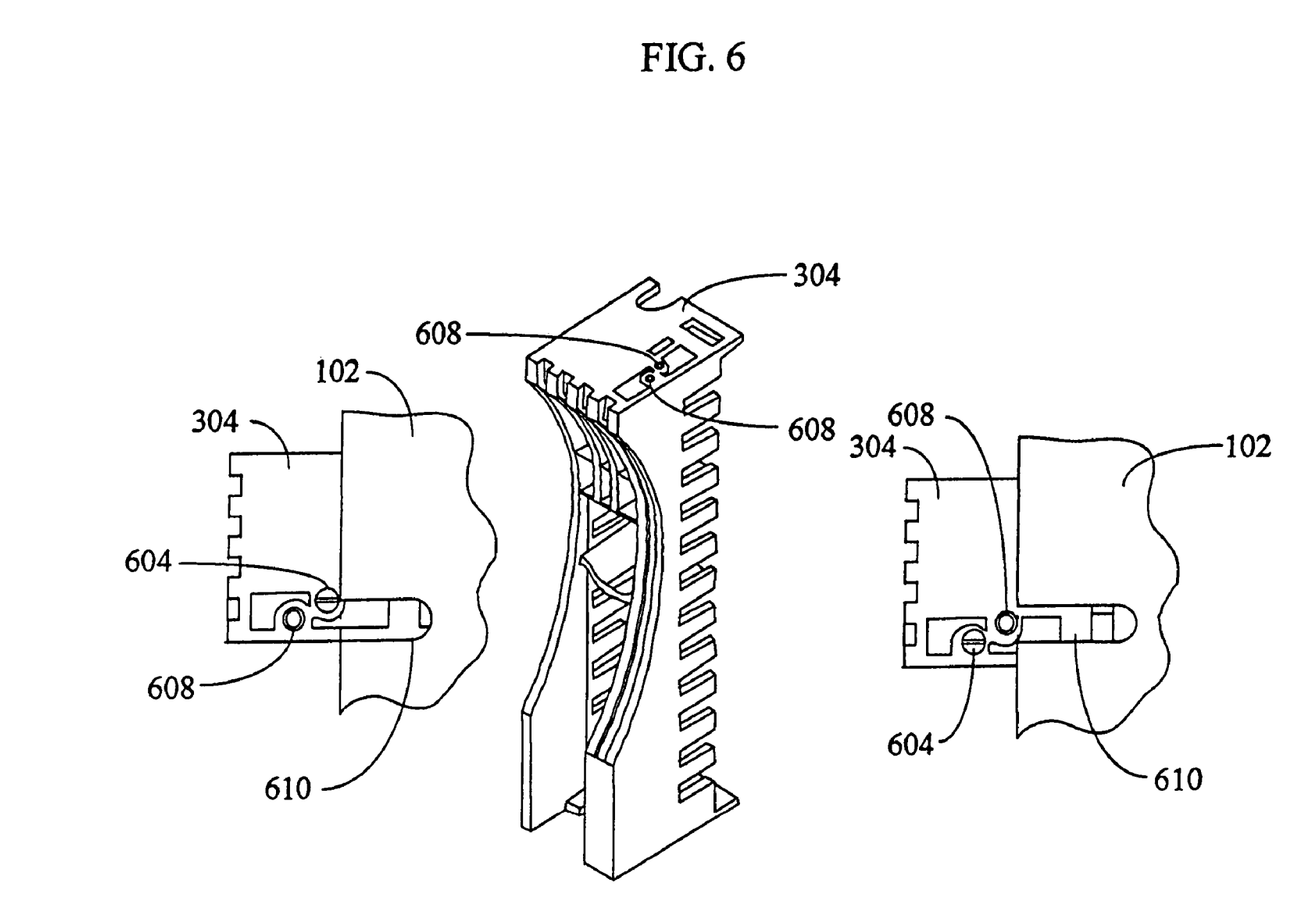
FIG. 6 is a perspective view illustrating one embodiment of a keying arrangement in accordance with the present invention.
Figure 7:
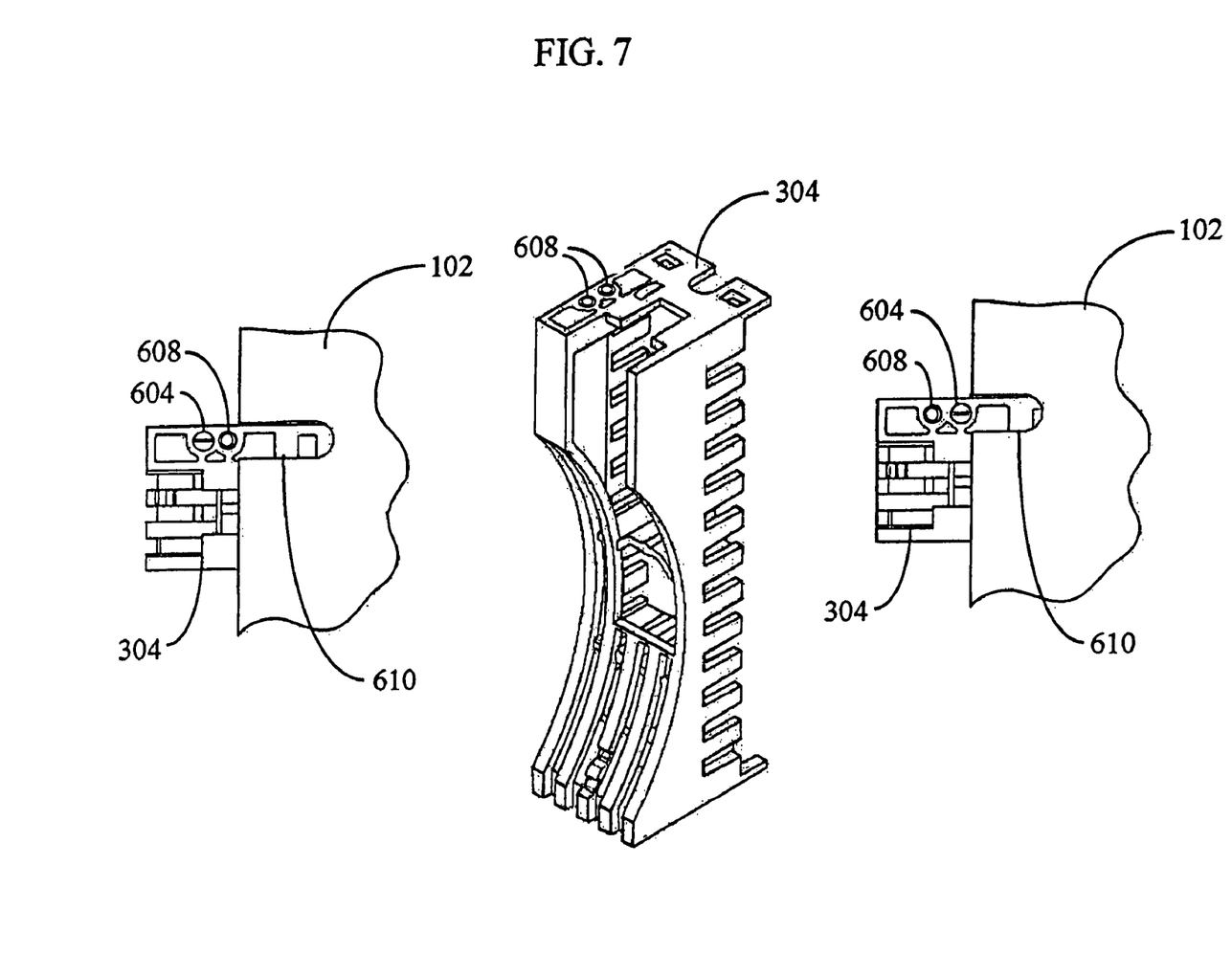
FIG. 7 is a perspective view illustrating another embodiment of the keying arrangement in accordance with the present invention.

FIGS. 6 and 7 illustrate a keying system according to one embodiment of the present invention. In this embodiment, the bezel 304 and the enclosure chassis 102 are configured to prevent the bezel 304 with a disk drive having one particular interface from engaging an incompatible interface located in the enclosure chassis 102. For example, a storage device carrier 300 with a disk drive having a fibre channel (FC) interface will only enter the enclosure chassis 102 having the FC interface. A storage device carrier 300 with a disk drive having an SCSI interface will only enter the enclosure chassis 102 having the SCSI interface.

In operation, to prevent the disk drive interface from engaging an incompatible interface of an enclosure chassis 102, a key 604 may be positioned into an appropriate key hole, or key position, 608 on the bezel 304. The key 604 is positioned in a key hole 608 that corresponds to the interface of the attached disk drive. The key protrudes outwardly from the bezel 304. The location or depth of a groove 610 on the enclosure chassis 102 corresponds to the type of interface the enclosure chassis 102 carries, or the type of interface the enclosure chassis 102 is configured to receive. If the bezel 304 is keyed differently than the enclosure device 102, the key 604 engages the enclosure device 102 rather than entering the groove 610.

The interfaces may be incompatible due to the number of pins that one type of interface may require, or due to the physical arrangement of the pins, or some other reason. For instance, the disk drive interface may be a male connector comprising fifty pins. Accordingly, for the disk drive interface to appropriately connect to the enclosure device 102 the enclosure device must be configured with a female connector comprising fifty female connections. In another example, the disk drive interface connector may comprise a circular arrangement of pins, thus requiring the interface connector on the enclosure chassis 102 to also have a circular arrangement. Table 2 shows which interface connections are compatible with each other.

TABLE 2

| Disk Drive | FC Enclosure chassis | SCSI Enclosure chassis | SATA Enclosure chassis | SAS Enclosure chassis |
|---|---|---|---|---|
| FC | Yes | No | No | No |
| SCSI | No | Yes | No | No |
| SATA | No | No | Yes | Yes |
| SAS | No | No | No | Yes |

FIG. 6 shows an example of the keying arrangement according to one embodiment of the present invention. In this example, the bezel 304 is keyed for disk drives having an SCSI interface connector, while the enclosure chassis 102 is keyed with the groove 610 to receive disk drives having an FC interface connector. The key 604 denies bezel 304 access into the enclosure chassis 102 by misaligning the bezel 304 to the enclosure chassis 102, thus indicating that the disk drive has an incompatible interface connector with the interface connector in the enclosure chassis 102. Bezel 304 access would be granted by positioning the key 604 in the adjacent key hole 608, or by obtaining a bezel 304 keyed for the proper disk drive.

Similarly, FIG. 7 shows a side of the bezel 304 keyed for disk drives having a serial at attachment (SATA) interface connector and the enclosure chassis 102 keyed to receive disk drives with a serial attached SCSI (SAS) interface connector. In this example, the enclosure chassis 102, configured with either an SATA interface or SAS interface connector, would receive the bezel 304 keyed for a disk drive with an SATA interface connector. However, the bezel 304, keyed for a disk drive with an SAS interface connector, would only fit in the enclosure chassis 102 configured with an SAS interface connector. For the bezel 304 to enter the enclosure chassis 102, the key 604 must align with the groove 610 in the enclosure chassis 102, or the groove 610 must be deep enough to accept the bezel 304.

It is understood that the above-described arrangements are only illustrative of the application of the principles of the present invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for reducing vibration originating from at least one storage device, comprising the steps of:
    providing an enclosure chassis configured to store at least one storage device;
    providing a mounting surface oriented vertically and coupled to the enclosure chassis to form one wall of a drive bay, the mounting surface configured for receiving a horizontally oriented storage device carrier;
    providing a first layer on the mounting surface;
    providing a second layer on the mounting surface; and
    providing a viscoelastic layer disposed between the first and second layer of the mounting surface for reducing vibration propagation throughout the mounting surface; and
    providing an interface shelf oriented horizontally and coupled to the enclosure chassis such that the interface shelf isolates horizontal storage device bays above the interface shelf from storage device bays below the interface shelf.

2. The method according to claim 1, further comprising the steps of:
    providing a first layer on the enclosure chassis;
    providing a second layer on the enclosure chassis; and
    providing a viscoelastic layer disposed between the first and second layer of the enclosure chassis, for reducing vibration propagation throughout the enclosure chassis.

3. The method according to claim 1, further comprising the steps of:
    providing a storage device carrier for retaining a storage device;
    securing a receiver to the mounting surface for receiving the storage device carrier; and
    coupling at least one clip-on damped spring to the storage device carrier, for resiliently coupling the storage device carrier between a receiver formed in the mounting surface and the mounting surface.

* * * * *